July 9, 1963   L. J. MELHART   3,097,256
CAPACITOR DISCHARGING DEVICE
Filed Dec. 28, 1962
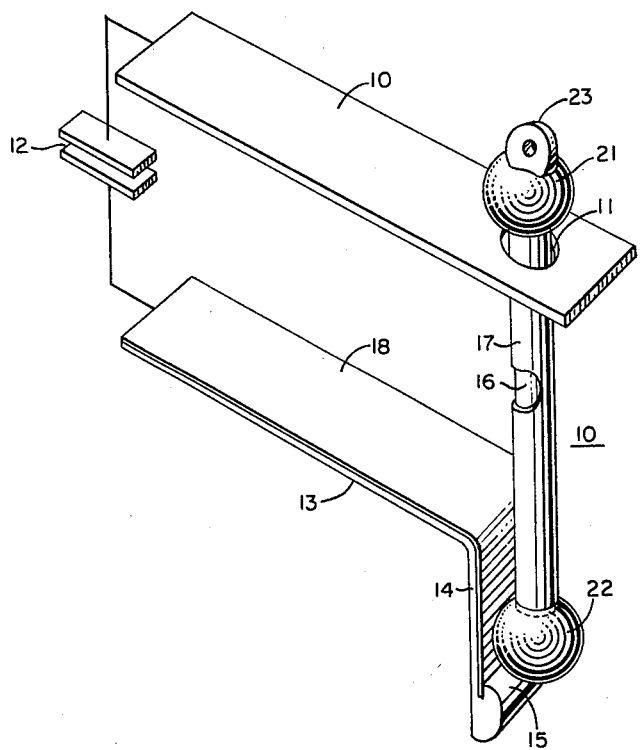
INVENTOR.
LEONARD J. MELHART
BY
ATTORNEY

3,097,256
CAPACITOR DISCHARGING DEVICE
Leonard J. Melhart, 6511 Abbington Drive,
Oxon Hill, Md.
Filed Dec. 28, 1962, Ser. No. 248,162
3 Claims. (Cl. 174—5)
(Granted under Title 35, U.S. Code (1952), sec. 266)

The invention described herein may be manufactured and used by or for the Government of the United States of America for governmental purposes without the payment of any royalties thereon or therefor.

The present invention relates to a safety device and more particularly to a capacitor discharging device for discharging stored energy which may be retained on the charged surfaces of a capacitor.

Various electrical circuits are made that contain capacitors which if accidently touched will not be harmful; however, with high voltage capacitors such as used in industry or in research there can remain sufficient electrical charge on a capacitor that the capacitor may be harmful. Also, such a capacitor may inadvertently be fully charged and lethal. Thus it is important to remove any electrical charge from capacitors that may be in an area so that one may touch the capacitor or electrical circuitry connected with the capacitor without hazard. Various means have been used in the past, such as a lever or bar which makes contact with the ground and high voltage sides of the capacitor, or some means of making a connection between the ground and high voltage side of the capacitor. In the shorting means used heretofore, the effect of the magnetic field on an arc established while making contact has not been considered. In the prior art devices, the shorting means become damaged by burning, pitting, erosion, etc., and under some conditions may even become welded to the capacitor terminals.

It is therefore an object of the present invention to provide an external discharge path for a capacitor.

Another object is to provide a capacitor shorting device which is of simple construction, easily operated and relatively inexpensive.

Still another object is to provide a shorting device which is not affected by arcing due to the shorting operation.

Yet another object is to provide a high current shorting device which is not affected by contacting the terminals of a high current capacitor.

Other objects and advantages of the invention will hereinafter become more fully apparent from the following description of the annexed drawing, which illustrates a preferred embodiment and wherein:

The drawing illustrates a plan view of a suitable device for carrying out the teaching of the invention.

The present invention is directed to a device for providing an external discharge path for a capacitor or group of capacitors for removing any electrical charge built up within the capacitor(s). The device is provided with a special contact arrangement which utilizes the blowout effect of a self-induced magnetic field produced by current flow through the contact arrangement. The contact arrangement provides good contact surfaces, provides proper alignment of the contacts and is suitable for high currents. The present invention relates to a capacitor discharging device and is here described in use as a capacitor shorting device for discharge of stored energy which may be retained on the charged surfaces of a capacitor. In this context it is a safety device.

Now referring to the drawings there is shown in plan view an illustration of a suitable device for carrying out this invention. As shown, the device includes a top plate 10 made of copper, brass, or any suitable electrical conductor. The plate is provided with a hole or aperture 11 near one end and is electrically connected at the opposite end to the high energy side of a capacitor 12. The ground side of the capacitor is electrically connected to a plate 13 made of brass, copper, or any other suitable electrically conductive material. The plate extends in a direction parallel with the upper plate and is positioned sufficiently far apart to prevent an electrical discharge between the plates; however, suitable insulation 18 may be provided between the plates to prevent a discharge between the plates. The plate 13 is bent with a portion thereof at an angle of about 90° such that the end 14 extends downwardly away from the upper plate 10. The free end of the plate portion 14 is provided with an electrode 15 thereon which aligns with the inner edge of the aperture 11. A rod 16 having insulation 17 thereon is passed through the aperture 11 with a loose fit and is provided with spherical or ball-shaped terminals 21, 22, at the ends of the rod. For the purposes of this specification, a bar 10 comprises rod 16 with the ball-shaped terminals 21 and 22 secured thereto. The upper ball-shaped terminal is made larger than the aperture and the lower ball-shaped terminal 22 is made comparable in diameter so that the terminal 22 will not pass through the aperture but will act as a stop. For the purpose of assembling the bar, the lower ball-shaped terminal is screw threaded onto the rod 16 after the rod has been passed through the aperture 11. The upper terminal mates with the aperture such that a circular contact is made between the ball-shaped terminal 21 and the aperture when the rod is lowered into contact position. The lower ball-shaped terminal makes contact with the electrode 15 when the rod is lowered such that the upper terminal is in contact with the upper plate 10. The upper terminal is provided with an eye 23 or some suitable means for lowering and raising the bar into shorting contact and away from contact. The length of the shorting rod between the ball-shaped end terminals is slightly longer than the distance between the upper plate and the electrode on the bottom plate such that the lower ball-shaped electrode contacts the electrode prior to the upper ball-shaped electrode contacting the upper plate. Obviously the shorting bar must be positioned in essentially a vertical position for operation wherein it lowers into position by gravity.

The drawing illustrates only one shorting bar arrangement, however, it is obvious that a plurality of such devices can be assembled, one each for each one or parallel connected group of a plurality of capacitors such that each of the capacitors or parallel groups will be provided with a shorting bar device. When shorting a plurality of capacitors all of the capacitor shorting bars could be secured to a line and pulley arrangement to control all of the shorting bars simultaneously.

In operation, the plates of the shorting device are connected electrically to the terminals of a capacitor. The shorting bar is connected to some means for raising and lowering the bar. When charging or using the capacitor the shorting bar is raised sufficiently that an arc will not be produced between the shorting bar terminals and the plates of the shorting device. The shorting bar has insulation about the rod between the end terminals to prevent the rod from making contact with the upper plate. After using the capacitor and the capacitor is to be rendered in a safe, discharged condition, the shorting bar is lowered so that the ball-shaped end terminals make contact with the bottom electrode and the upper plate surface. As the shorting bar is lowered, an arc will discharge between the upper ball-shaped terminal of the shorting bar and the upper plate, this causes a current flow through the shorting bar which sets up a magnetic field about the bar and the ball-shaped terminal end of the bar. The magnetic field forces the arc away from the ball-shaped terminal such that the arc will be between the upper plate and higher up on the ball-shaped terminal than it would otherwise. Thus the arc will be away from the circular contact area of the ball which makes contact with the plate about the aperture. Such a structure provides a contact surface on the ball-shaped terminal which is 3.14 times the diameter of the aperture in the plate. An arc will also be made between the lower ball-shaped terminal on the shorting bar and the electrode on the bottom plate. If the current produced by the capacitor is large enough then the magnetic field about the vertical section of the bottom plate will also blow the arc away from the contact surface of the ball-shaped terminal at the lower end of the shorting bar and the bottom electrode 15.

The magnetic blowout principle about the upper terminal and the aperture and about the lower terminal and the bottom electrode 15 is set forth in U.S. Patents, 2,909,695 and 2,936,390.

If the current through the shorting device is not large enough to cause contact damage, then the blowout detail associated with the lower stationary termination can be neglected. The only requirement then is that the ball-shaped bottom terminal touch and come to rest on a lower metallic termination thereby completing the circuit.

The shorting bar arrangement of the present invention provides a device which can be used to short out high current capacitors with very little, if any, harmful effect on the shorting device. The aperture in the upper plate acts as an alignment guide for the shorting bar. The aperture in the upper plate provides a large contact area between the upper plate and the upper ball-shaped terminal on the shorting bar. Since each end of the shorting bar has ball-shaped end terminals, the shorting bar can be rotated to provide a new contact surface between the bottom electrode and the lower ball-shaped terminal on the shorting bar. The shorting bar is insulated between the ball-shaped end terminals to insulate the non-contacting area of the shorting bar. The shorting bar arrangement also is adapted for large scale operation for separately shorting a plurality of capacitors by use of a single shorting device for each separate capacitor group and having the many shorting devices operated by a single mechanism.

Obviously many modifications and variations of the present invention are possible in the light of the above teachings. It is therefore to be understood that within the scope of the appended claims the invention may be practiced otherwise than as specifically described.

What is claimed is:

1. A capacitor discharging device adapted to be connected electrically with the terminals of a capacitor which comprises:
   an upper electrically conductive plate,
   an aperture in said plate near one end thereof,
   an electrically conductive shorting bar,
   said shorting bar comprising an insulated rod with ball-shaped electrically conductive end terminals,
   a lower electrically conductive plate spaced from said upper plate and extending in the same direction,
   said rod secured for a loose fit through said aperture in said upper plate,
   said ball-shaped end terminals adapted to make an electrical contact with said upper plate along the circumference of said aperture therein and to contact said bottom plate,
   said shorting bar rendering said capacitor in a discharged safe condition.

2. A capacitor discharging device adapted to be electrically connected with the terminals of a capacitor which comprises:
   an upper electrically conductive plate,
   an aperture in said upper plate near one end thereof,
   a lower electrically conductive plate spaced from said upper plate and extending in the same direction,
   an electrically conductive electrode fixed to said lower plate at an end thereof in alignment with said aperture in said upper plate,
   an elongated cylindrical electrically conductive rod secured for a loose fit through said aperture in said upper plate,
   a ball-shaped electrically conductive terminal on each end of said rod,
   insulation on said rod along the length thereof between said terminals on the ends thereof,
   said ball-shaped terminal on one end of said rod adapted to make an electrical contact with said upper plate along the circumference of said aperture therein,
   said ball-shaped terminal on the other end of said rod adapted to contact said electrode fixed onto said lower plate,
   said terminals on the ends of said rod when in contact with their respective plates rendering said capacitor in a safe discharged condition.

3. A capacitor discharging device adapted to be electrically connected with the high voltage and ground terminals of a capacitor which comprises:
   an elongated upper plate made of an electrically conducting material and adapted to be electrically connected at one end with said high voltage terminal of said capacitor,
   an aperture in said upper plate near the end thereof opposite from said end adapted to be connected to said high voltage terminal,
   an elongated lower plate made of an electrically conducting material and adapted to be electrically connected at one end to said ground terminal of said capacitor,
   said lower plate having a portion extending in the same direction as said upper plate and a portion extending downwardly perpendicular to said upper plate,
   an electrically fixed conductive electrode fixed to said downwardly extending portion of said lower plate,
   said electrode being in alignment with said aperture in said upper plate,
   an electrically conductive shorting bar,
   said shorting bar including a cylindrical rod with said upper and lower spherical-shaped electrically conductive end terminals thereon,
   said upper spherical terminal secured to said rod above said upper plate,
   said lower spherical terminal secured to said rod below said upper plate,
   said rod having an insulation covering the length thereof between said upper and lower spherical terminals,
   said upper spherical terminal on said rod adapted to make an electrical contact wtih said upper plate along the circumference of said aperture therein,
   said lower spherical terminal on said rod adapted to make an electrical contact with said electrode fixed to said lower plate when said upper terminal makes contact with said upper plate,
   said shorting bar rendering said capacitor in a safe discharged condition when said upper and lower spherical terminals are in contact with their respective plates.

No references cited.